United States Patent Office 3,631,140
Patented Dec. 28, 1971

3,631,140
PROCESS FOR PREPARING POLYTETRA-
FLUOROETHYLENE ORGANOSOLS
James C. Fang, Media, Pa., assignor to E. I. du Pont
de Nemours and Company, Wilmington, Del.
No Drawing. Continuation-in-part of applications Ser. No.
413,333, Nov. 23, 1964, Ser. No. 528,047, Feb. 17,
1966, Ser. No. 654,333, July 19 1967 and Ser. No.
738,825, June 21, 1968. This application July 1, 1970,
Ser. No. 51,723
Int. Cl. C08f 45/28, 45/34, 47/16
U.S. Cl. 260—33.4 F                  5 Claims

ABSTRACT OF THE DISCLOSURE

A process for preparing dispersions of polytetrafluoroethylene in organic liquids which comprises mixing particulate polytetrafluoroethylene and an organic liquid having a surface tension below about 25 dynes per centimeter and then milling the mixture.

CROSS-REFERENCES TO RELATED APPLICATIONS

This application is a continuation-in-part of applications Ser. No. 654,333, filed July 19, 1967; 528,047, filed Feb. 17, 1966; and 413,333, filed Nov. 23, 1964, and Ser. No. 738,825, filed June 21, 1968, all abandoned.

BACKGROUND OF THE INVENTION

This invention relates to a process for preparing dispersions of polytetrafluoroethylene (PTFE) in organic liquids.

Aqueos dispersions of PTFE have been known for some time and have been extensively used to coat and impregnate articles with these polymers. These aqueous dispersions, however, have a tendency to coagulate irreversibly when subjected to excessive heat, freezing, mechanical agitation, or on the addition of electrolytes or water soluble solvents. They are also difficult to bond firmly to metal substrates without expensive and bothersome pretreatments.

In an attempt to prepare compositions without these shortcomings, dispersions of PTFE have been prepared in organic liquids. These dispersions, however, have been unsatisfactory because they coagulate undesirably and settle quickly. This makes them unsuitable for commercial use.

The process of this invention makes possible the preparation of PTFE dispersions having none of these shortcomings. They are remarkably stable to coagulation, resist settling, and moreover, permit firm bonding of coatings to metal substrates without the pretreatment required when aqueous dispersions are used.

SUMMARY OF THE INVENTION

The PTFE used to prepare the dispersions is the well-known polymeric material described in U.S. Pat. 2,230,654.

The PTFE should have a molecular weight of at least about 20,000 to obtain the beneficial effects of the invention, for materials with molecular weights of less than this tend to be waxy and unsuited for preparing dispersions in organic liquids.

PREPARATION OF THE DISPERSIONS

According to the invention, a PTFE powder prepared with the apparatus described in U.S. Pat. 3,147,958 is thoroughly mixed with an organic liquid having a surface tension no greater than about 25 dynes per centimeter,[1] preferably 18 to 20 dynes per centimeter. Illustrative of such liquids are t.butanol and a 2/1 mixture of t.butanol and cyclohexane. The mixture is then stirred or ball-milled for about 2 hours to give the dispersion.

The ratio of polymer powder to organic liquid will be dictated by the solids content required in the composition, which in turn will be dictated by its intended use. Generally, the dispersion will contain 1–50% of solids.

The dispersions prepared in this way contain discrete polymer particles having an average radius of about 0.01 to about 3 microns, no more than 50% (by weight) of the particles having radii larger than 3 microns.[2] Generally speaking, stability of the dispersions increases with decreasing particle size. Highly preferred dispersions therefore have particles whose average radius ranges from 0.01 to 0.9 micron.

The dispersions contain from about 1% to about 50%, by weight, of particulate polymer. Dispersions preferred for their stability contain about 30–40%, by weight, of polymer. The dispersions will vary in viscosity according to their solids content and according to the organic liquids used, and can range from free-flowing to thixotropic viscid fluids.

The dispersions are highly stable. They can remain in storage for extended periods with no appreciable coagulation or changes in viscosity. If over a period of time slight settling should occur, the particles can be easily redispersed by agitating the dispersions briefly. In addition, the dispersions do not coagulate on heating, freezing, agitation or on addition of salts, electrolytes or other miscible organic liquids.

UTILITY

The dispersions of the invention are suitable for direct use as coating compositions, but pigments otherwise suitable for use in organic coating compositions can be added if desirable. The compositions can be applied by such conventional methods as spraying, brushing, dipping or roller coating. They air dry quickly, leaving behind powdery residues of polymer which give the coated articles lubricious surfaces. The dispersions are therefore highly useful as lubricating sprays for industrial and household purposes. Those dispersions in which the organic liquid is a "Freon"® fluorocarbon can be packaged in conventional aerosol spray cans.

Tough, permanent, continuous, lubricious films of PTFE can be produced on any substrate capable of withstanding the heat treatment involved by applying a dispersion of the invention to a substrate and then heating it to a temperature of from about 650–800° F. for 10–30 minutes. Such fused films are a boon on kitchen utensils and ice-cube trays, where they prevent sticking and caking. The films also have good electrical insulating properties.

---

[1] Measured at 25° C. by the du Nouy ring method, as described in American Society for Testing and Materials, Method D/1331–56.

[2] Measured by direct microscopic examination at a magnification of about 750 diameters. Particle dimensions can be measured by comparison with an eye-piece scale or by direct comparison with markings on a calibrated slide.
Particle size can also be measured by the angular dependent light scattering method described by Aughey et al. in J. Opt. Soc. Am., 44, 833 (1954).
Particles smaller than about 1.0 micron can be measured by electron microscopy.

DESCRIPTION OF THE PREFERRED EMBODIMENTS

The following example is submitted so that the invention can be more easily understood and readily practiced. It is intended to be illustrative and shows only the preferred embodiment of the invention. Those skilled in the art will no doubt be able to compose numerous variations on its central theme. It is fully intended that these variations be considered part of the basic inventive concept.

In the example, all proportions are by weight unless otherwise indicated.

EXAMPLE 1

Into a porcelain mill containing 2000 parts of pebbles were placed 200 parts of PTFE powder and 800 parts of t.butanol. This mixture was ground for 24 hours on a rolling mill. The mill contents were then filtered to give a uniform stable dispersion containing 20% solids, whose particles had radii in the range 0.5–3 microns, the average being about 1.0 micron.

A 2/1 mixture of t.butanol and cyclohexane can also be used, in the same amount, with equivalent results.

What is claimed is:

1. A process for preparing an organosol containing from 1–50% by weight of polytetrafluoroethylene, said process comprising admixing particulate polytetrafluoroethylene and an organic liquid having a surface tension below about 25 dynes per centimeter, measured at 25° C., and then milling said mixture until the polytetrafluoroethylene particles have an average radius of from about 0.01 to about 3 microns, with no more than 50% of the particles being larger than 3 microns in radius.

2. The process of claim 1 wherein the organic liquid has a surface tension of 18–20 dynes/centimeter.

3. The process of claim 2 wherein the organic liquid is butanol.

4. The process of claim 1 wherein the milling proceeds until the polytetrafluoroethylene particles have an average radius of from 0.1 to 0.9 micron.

5. The process of claim 1 wherein the organic liquid is a mixture of t.butanol and cyclohexane.

References Cited

UNITED STATES PATENTS

| | | | |
|---|---|---|---|
| 2,777,783 | 1/1957 | Welch | 260—33.6 F |
| 2,976,257 | 3/1961 | Dawe et al. | 260—33.4 F |

ALLAN LIEBERMAN, Primary Examiner

U.S. Cl. X.R.

260—33.6 F, 34.2

PO-1050
(5/69)

UNITED STATES PATENT OFFICE
CERTIFICATE OF CORRECTION

Patent No. 3,631,140      Dated December 28, 1971

Inventor(s) James C. Fang

It is certified that error appears in the above-identified patent and that said Letters Patent are hereby corrected as shown below:

In the specification, col. 1, line 67, change "3,147,958" to -- 3,146,958 --.

Signed and sealed this 30th day of May 1972.

(SEAL)
Attest:

EDWARD M. FLETCHER, JR.
Attesting Officer

ROBERT GOTTSCHALK
Commissioner of Patents